US005808283A

United States Patent [19]

Stanton et al.

[11] Patent Number: 5,808,283

[45] Date of Patent: Sep. 15, 1998

[54] MODULAR POINT-OF-SALE TRANSACTION APPARATUS AND METHOD OF MANUFACTURE AND ASSEMBLY

[75] Inventors: James Mark Stanton, San Jose, Calif.; Chin-Yi Ko, Taipei; Shih-An Hsu, Taoyuan, both of Taiwan

[73] Assignee: Verifone Inc., Santa Clara, Calif.

[21] Appl. No.: 698,885

[22] Filed: Aug. 17, 1996

[51] Int. Cl.$^6$ .................... G06K 7/06

[52] U.S. Cl. .................... 235/441; 235/432

[58] Field of Search .................... 235/441, 432; 248/676

[56] References Cited

U.S. PATENT DOCUMENTS

| | | | |
|---|---|---|---|
| D. 323,085 | 1/1992 | Konkel . | |
| D. 344,076 | 2/1994 | Zahabi . | |
| D. 355,437 | 2/1995 | Reph . | |
| D. 356,074 | 3/1995 | Coblentz et al. . | |
| D. 358,162 | 5/1995 | Buie et al. . | |
| 4,776,554 | 10/1988 | Shekita et al. . | |
| 4,840,344 | 6/1989 | Moroe . | |
| 4,900,909 | 2/1990 | Nagashima et al. | 235/432 |
| 5,040,766 | 8/1991 | Egly et al. . | |
| 5,106,051 | 4/1992 | Jondelius . | |
| 5,232,276 | 8/1993 | Martin . | |
| 5,284,923 | 2/1994 | Watt et al. . | |
| 5,289,923 | 3/1994 | Coblentz et al. . | |
| 5,347,115 | 9/1994 | Shermann et al. . | |
| 5,394,994 | 3/1995 | Coblentz et al. . | |
| 5,532,466 | 10/1993 | Konno et al. | 235/472 |

*Primary Examiner*—Harold Pitts
*Attorney, Agent, or Firm*—Lowell C. Bergstedt

[57] ABSTRACT

A modular point-of-sale transaction apparatus comprising a modular portion having a printer mechanism mounted within a housing thereof and having structure providing a terminal platform for supporting a transaction terminal in a prearranged position forward or rearward of the printer mechanism. The housing for the printer and the platform for supporting the transaction terminal are formed in size and shape and location such that the combination of the modular portion and the transaction terminal has substantially the appearance of a single integrated terminal and printer apparatus.

19 Claims, 11 Drawing Sheets

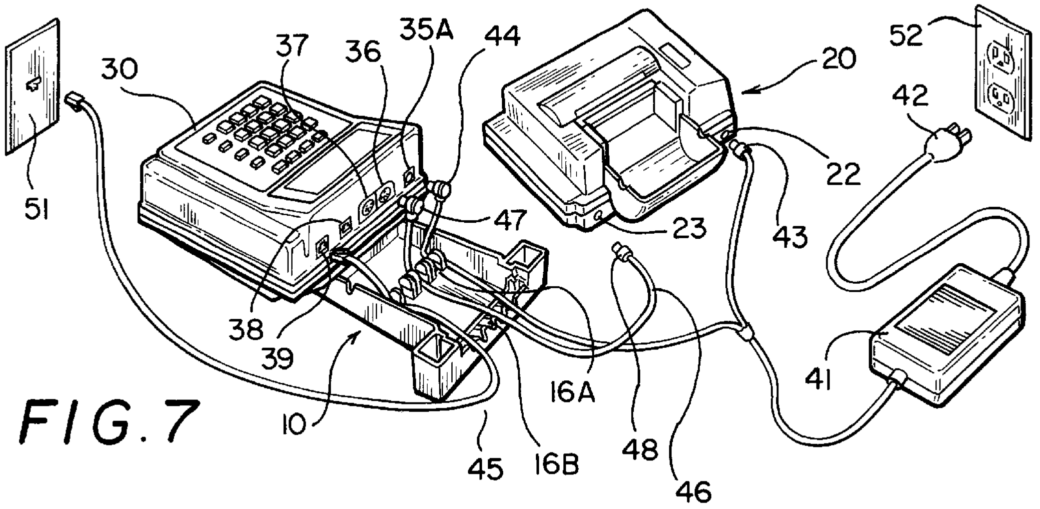
FIG. 7
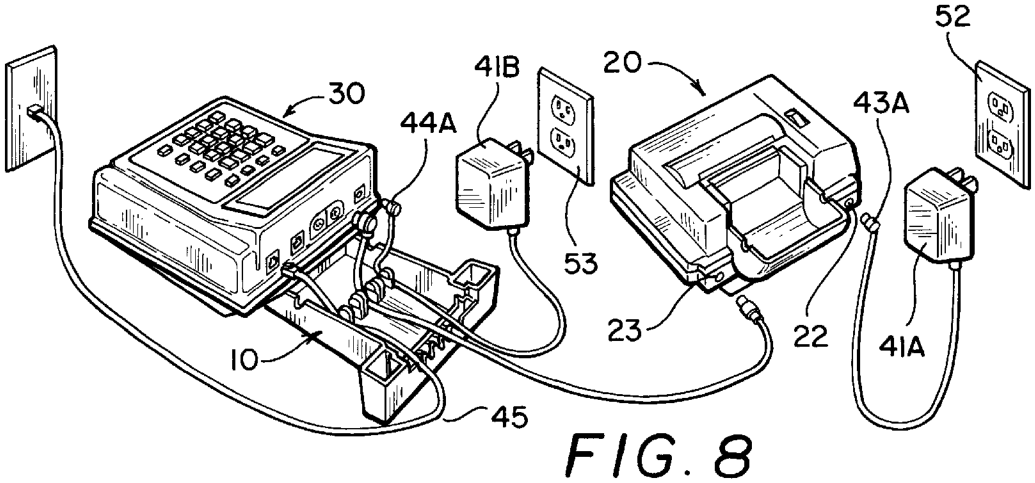
FIG. 8
FIG. 9
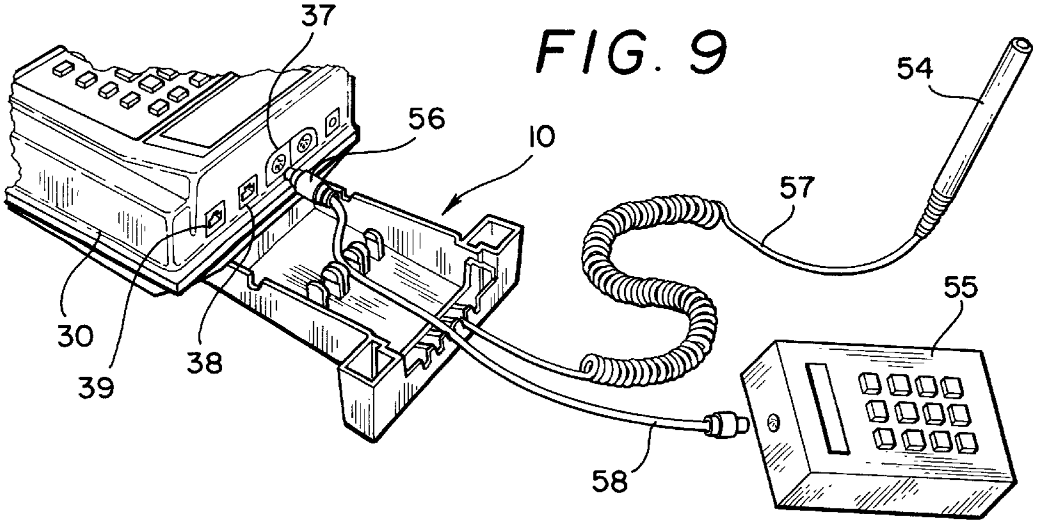

FIG. 14
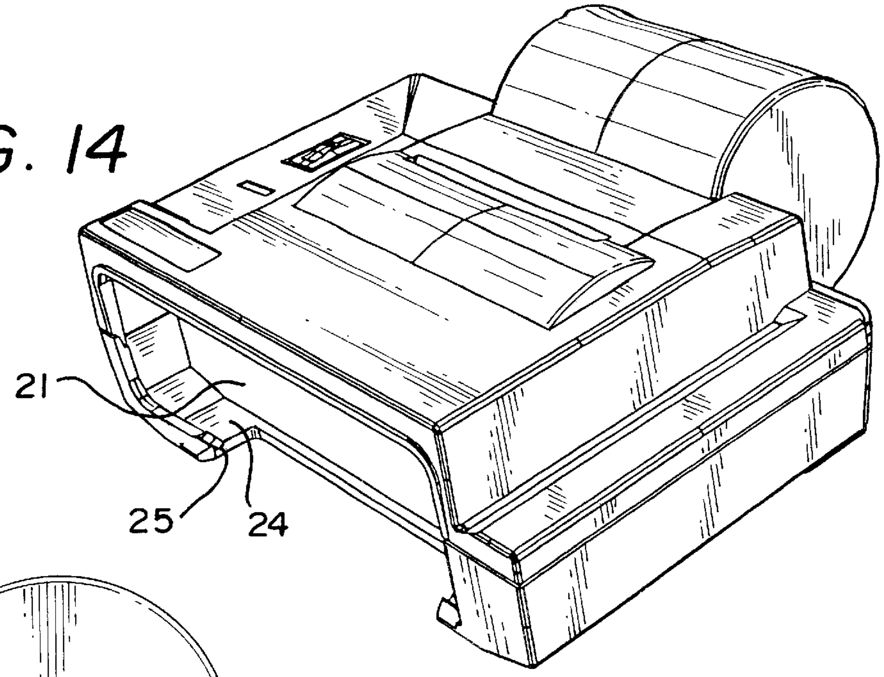
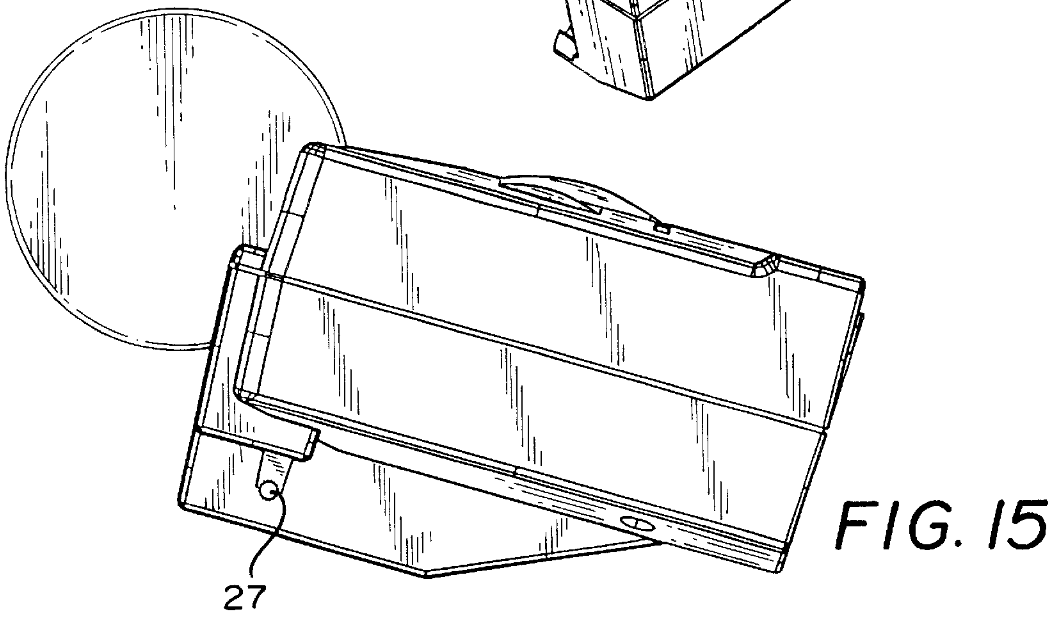
FIG. 15
FIG. 16
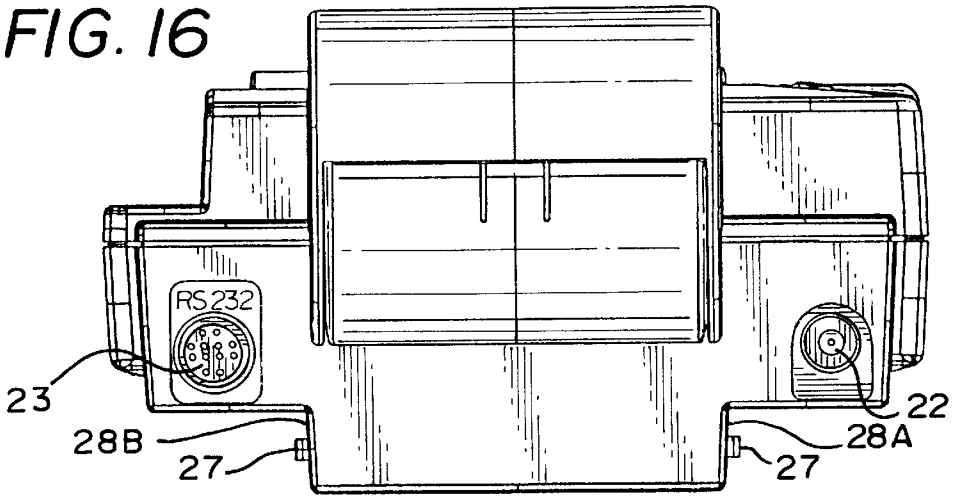

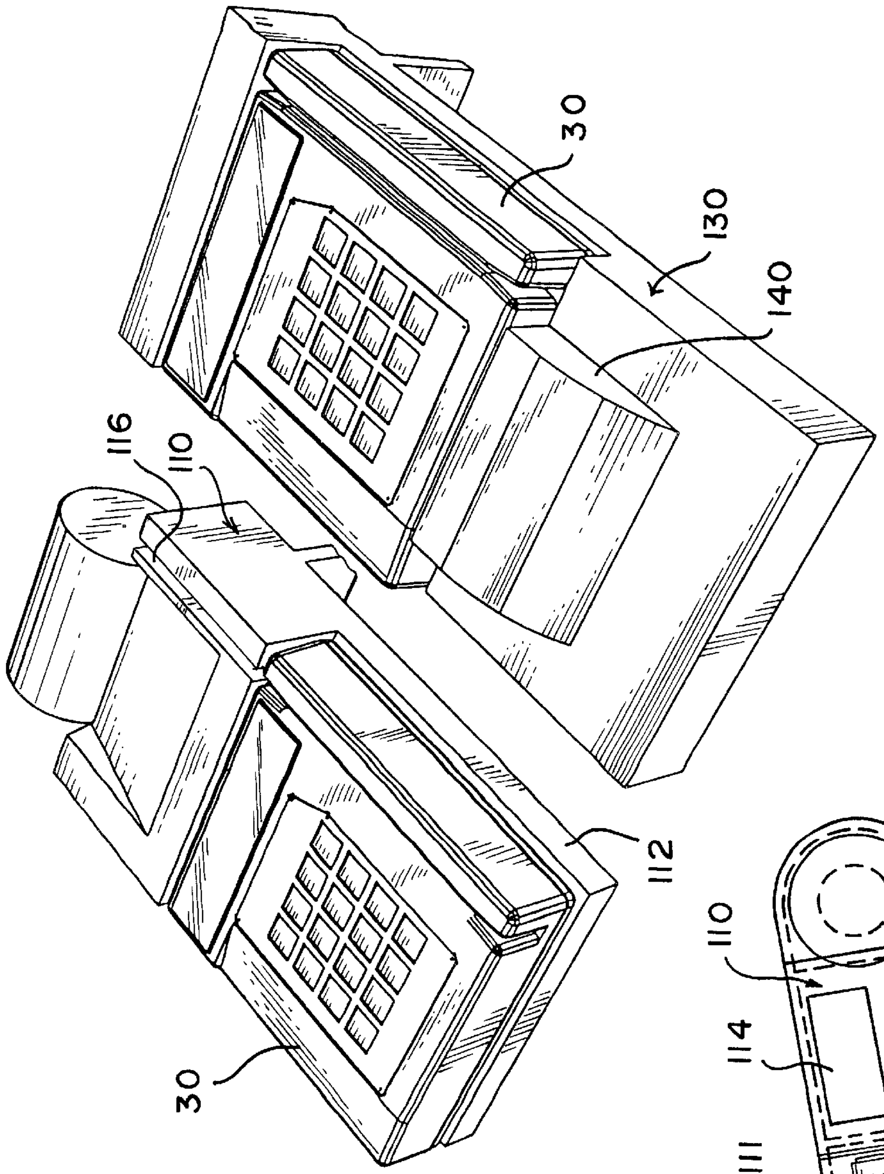
FIG. 17A
FIG. 17B
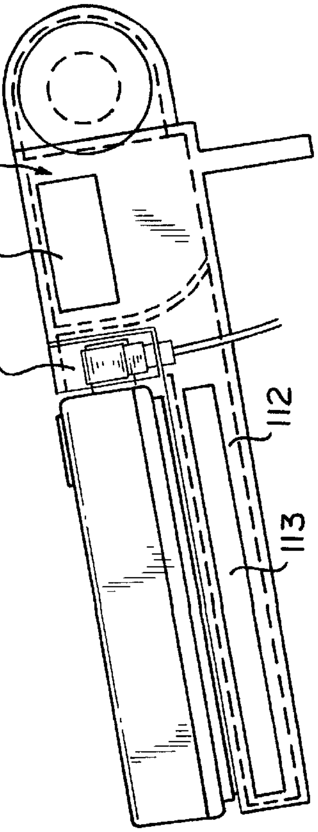
FIG. 18

MODULAR POINT-OF-SALE TRANSACTION APPARATUS AND METHOD OF MANUFACTURE AND ASSEMBLY

FIELD OF THE INVENTION

This invention relate in general to modular point-of-sale transaction terminal systems and in particular to point-of-sale transaction terminal system in which various separate modules, such a transaction terminal and printer modules are mounted on a base unit.

BACKGROUND OF THE INVENTION

It is well known in the art to provide mounting platforms for modular units to tie them together into a single integrated structure for convenience of carrying, operation and the like. In the traction terminal field, there are many prior art versions of stands for terminals and printers and the other units to provide convenient mounting relationship between these separate units.

For example, a number of years ago, VeriFone Inc. provided a stand for a transaction terminal and a telephone unit to hold the two separate modules in side by side relationship.

Each of the following patents illustrates one of the prior art approaches to mounting various point-of-sale equipment modules on a stand or in other ways to provide a convenient and easy to use assembly thereof:

Moroe U.S. Pat. No. 4,840,344

Shekita et al. U.S. Pat. No. 4,776,554

Watt et al. U.S. Pat. No. 5,284,253

Coblentz et al. U.S. Pat. No. 5,394,994

Sherman et al. U.S. Pat. No. 5,347,115

Coblentz et al. U.S. Pat. No. D356,074

Konkel U.S. Pat. No. D323,085

Buie et al. U.S. Pat. No. D358,162

Zahabi U.S. Pat. No. D344,076

Reph U.S. Pat. No. D355,437

None of these designs and systems provides a simple and facile approach to assembling a transaction terminal and a printer module into an overall system that has substantially the appearance of a completely integrated system, i.e. one in which the various modules seem to be all part of one unit inside a single housing.

OBJECTS OF THIS INVENTION

It is the principal object of this invention to provide a modular point-of-sale transaction apparatus including a terminal and printer which has substantially the appearance of a system in which all the unit are in a single housing.

FEATURES AND ADVANTAGES OF THIS INVENTION

One aspect of this invention features a modular point-of-sale transaction apparatus comprising a modular portion having a printer mechanism mounted within a housing thereof and having structural means providing a terminal platform for supporting a traction terminal in a prearranged position forward or rearward of the printer mechanism. The housing for the printer and the platform for supporting the transaction terminal being formed in size and shape and location such that the combination of the modular portion and the transaction terminal has substantially the appearance of a single integrated terminal and printer apparatus.

OBJECTS OF THIS INVENTION

It is the principal object of this invention to provide a modular point-of-sale transaction apparatus including a terminal and printer which has substantially the appearance of a system in which all the unit are in a single housing.

FEATURES AND ADVANTAGES OF THIS INVENTION

One aspect of this invention features a modular point-of-sale transaction apparatus comprising a modular portion having a printer mechanism mounted within a housing thereof and having structural means providing a terminal platform for supporting a transaction terminal in a prearranged position forward or rearward of the printer mechanism. The housing for the printer and the platform for supporting the transaction terminal being formed in size and shape and location such that the combination of the modular portion and the transaction terminal has substantially the appearance of a single integrated terminal and printer apparatus.

Preferably, the modular portion comprises the combination of a base module and a separate printer module mounted on a printer mounting portion provided on a rearward portion of the base module. The terminal platform is defined on the base module at a prearranged forward portion thereof and is adapted to mount a transaction terminal thereon in a position such that a back wall portion of the transaction terminal is adjacent to a front wall portion of the printer module.

In one embodiment of the invention, the printer module is adapted to be used with a transaction terminal which has power and data connectors mounted on a rearward facing wall thereof. The printer module has a housing with a recessed forward wall portion adapted to cover the power and data connector means when forward wall portion adapted to cover the power and data connector means when both the printer module and the transaction terminal are mounted on the base module.

Preferably, the terminal platform is secured on the terminal platform of the base unit using cooperating securing structures formed on a top wall surface of the terminal platform and cooperating with associated securing structures defined on a bottom wall surface of the transaction terminal.

In a preferred embodiment, the printer mounting portion of the base module and bottom wall portions of the housing of the printer module cooperatively provide a slide-on mounting relationship between the base module and the printer module, including a cooperative detent and groove for securing the printer module on the printer mounting portion of the base module. In addition, the printer module is adapted to be used with a transaction terminal adapted to have power and data connector means mounted on a rearward facing wall thereof, and the printer module has a housing with a recessed forward wall portion adapted to cover the power and data connector means when both the printer module and the transaction terminal are mounted on the base module.

Preferably, the printer mounting portion of the base module comprises an open frame section having cable races defined thereon and adapted for receiving cables of the power and data connectors for the transaction terminal to route the cables underneath the printer module and through a back wall portion of the base module.

In a preferred embodiment, the terminal platform has a first securing structure formed on a top wall surface thereof and adapted for cooperating with associated second securing structure defined on a bottom wall surface of the transaction terminal to secure the transaction terminal on the terminal platform. The printer mounting portion of the base module and bottom wall portions of the housing of the printer module cooperatively provide a slide-on mounting relationship between the base module and the printer module, including cooperative detent and groove means for securing the printer module on the printer mounting portion of the base module.

With these features, the apparatus is adapted to be assembled with a transaction terminal by first mounting and securing the transaction terminal on the terminal platform using the securing arrangements on platform and terminal, then attaching the power and data connector means to the terminal at a rear wall portion thereof and placing the cables of the power and data connector means in the cable races defined on the open frame section, followed by sliding the printer module onto the printer mounting portion of the base module until the cooperative detent and groove means engage and the recessed forward wall portion of the printer module covers the power and data connector means previously attached to the rear wall portion of the terminal. In accordance with another aspect, this invention features a modular point-of-sale transaction apparatus comprising a base module, a printer module mounted on the base module, and a transaction terminal mounted on the base module. The base module has structural means providing a terminal platform for supporting a transaction terminal in a prearranged position forward or rearward of the printer module. The printer module has a housing of prearranged size and shape and the terminal platform is formed in size and shape and location such that the combination of the base module, the transaction terminal and the printer module has substantially the appearance of a single integrated terminal and printer apparatus.

In accordance with another aspect, this invention features a method of assembling a modular point-of-sale transaction apparatus using an existing type of transaction terminal of particular design and shape and having rear wall power and data connectors. The method involves forming a base module with a transaction terminal mounting platform on a forward portion thereof and a printer mounting section on a rearward portion thereof with the terminal mounting platform having size and shape such that it accommodates the shape of the transaction terminal. Another step of the method is forming a printer module adapted to mount on the base module and having a size and shape adapted to integrate wall with the size and shape of the transaction terminal, including a forward wall section adapted to receive and cover the power and data connectors of the transaction terminal.

The transaction terminal is then mounted on the terminal platform of the base module, the power and data connectors are mounted to the rear wall of the terminal; and finally the printer module is mounted on the printer mounting portion of the base module with the forward wall section thereof covering the power and data connectors.

Using the apparatus and method of this invention provides a way to easily integrate separate modules into a convenient unit that has the appearance and functionality of an integrated terminal and printer unit. Existing terminal devices can be retrofitted into the assembly of this invention to achieve a much more compact and operationally integrated transaction terminal system.

Other objects, features and advantages of this invention will be apparent from a consideration of the following detailed description of embodiments of the invention together with the accompanying drawings.

BRIEF DESCRIPTION OF DRAWING FIGURES

FIG. 7 is a pictorial view illustrating one approach to providing operating cable connections to a transaction terminal module and printer module of a modular point-of-sale transaction apparatus in accordance with this invention.

FIG. 8 is a pictorial view illustrating an alternative approach to providing operating cable connections to a transaction terminal module and printer module of a modular point-of-sale transaction apparatus in accordance with this invention.

FIG. 9 is a pictorial view illustrating an optional connection of a bar code wand or a PIN-Pad module to one of the ports of a transaction terminal module in a modular point-of-sale transaction apparatus in accordance with this invention.

FIG. 14 is a perspective view of a printer module of a modular point-of-sale transaction apparatus in accordance with this invention.

FIG. 15 is a side elevational view of a printer module of a modular point-of-sale transaction apparatus in accordance with this invention.

FIG. 16 is a back elevational view of a printer module of a modular point-of-sale transaction apparatus in accordance with this invention.

FIG. 17A and FIG. 17B illustrate alternative approaches to providing a modular point-of-sale transaction apparatus in accordance with this invention.

FIG. 18 is a side view illustrating details of an alternative embodiment of a modular point-of-sale transaction apparatus in accordance with this invention.

DESCRIPTION OF INVENTION EMBODIMENTS

Referring initially to FIGS. 1–6 of the drawings, it is seen that a modular point-of-sale transaction apparatus in accordance with a one embodiment of this invention comprises a base module 10, a printer module 20, and a transaction terminal module 30. Base module 10 provides a mounting and support arrangement for both printer module 20 and transaction terminal module 30. As FIGS. 1A and 1B illustrate, this embodiment of a modular point-of-sale transaction apparatus provides the look and feel of an integral terminal and printer unit when the three modules are assembled together.

Figure 2:
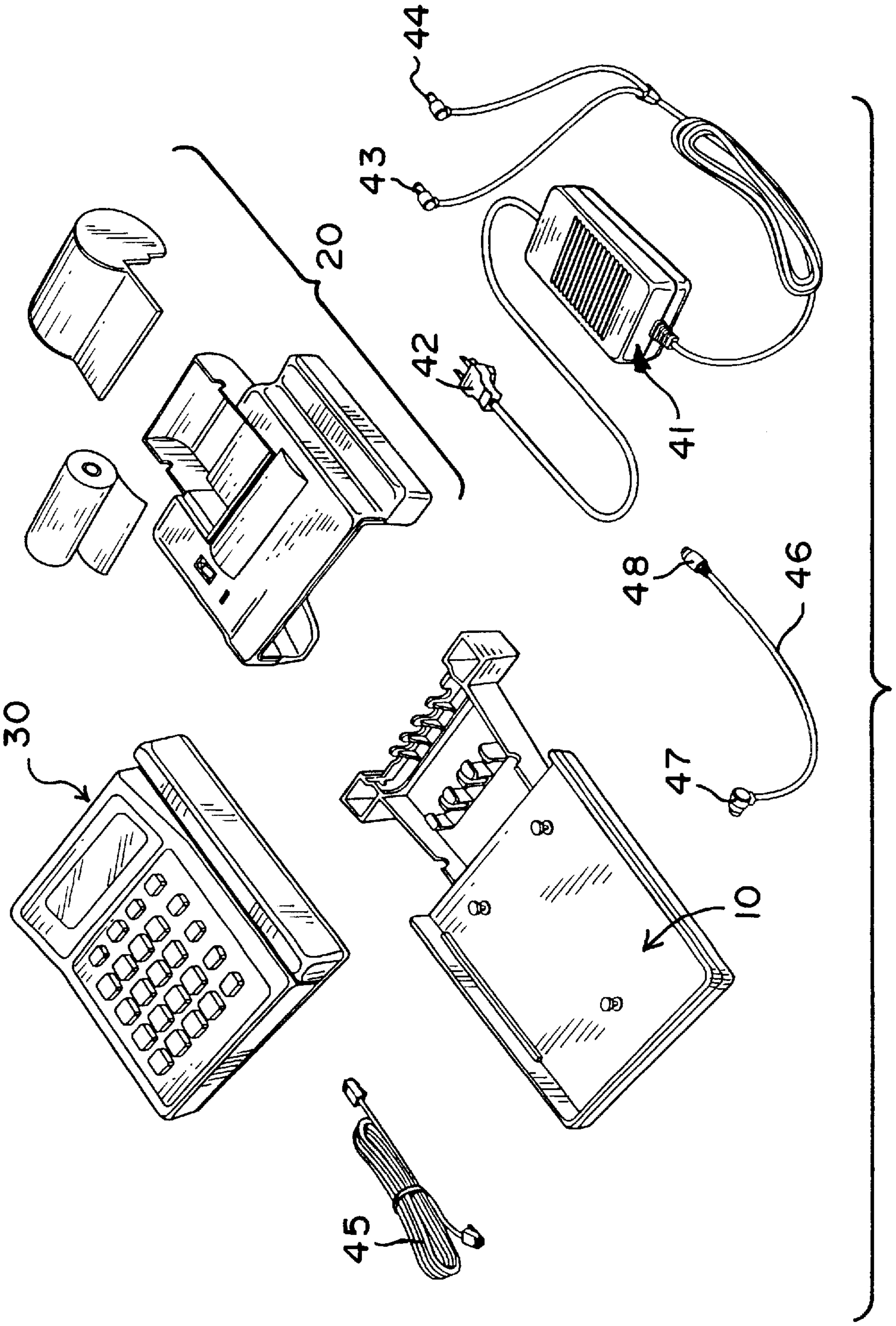
FIG. 2 is an exploded assembly view of the modules and accessories of a modular point-of-sale transaction apparatus in accordance with this invention.

As shown in FIG. 2, additional cables and a power supply are required to complete a modular point-of-sale transaction apparatus in accordance with this invention. Base module 10 and printer module 20 are specially constructed and arranged to accommodate the cabling required. Power supply 41 in the embodiment of FIG. 2 provides operating electrical power to both printer module 20 and transaction terminal module 30. Plug 42 is insertable in a standard electrical outlet and male connectors 43 and 44 are insertable into female receptacles provided on the printer module 20 and transaction terminal module 30 in a manner shown in FIG. 7 and described in more detail later. A standard telephone cord 45 provides telephone connection for transaction terminal module 30 to a telephone jack hooked to a public switched telephone network. Cable 46 is a serial port to serial port connector cable to couple data signals between transaction terminal module 30 and printer module 20. The use of these cables and ports is described in more detail below.

Figure 1A:
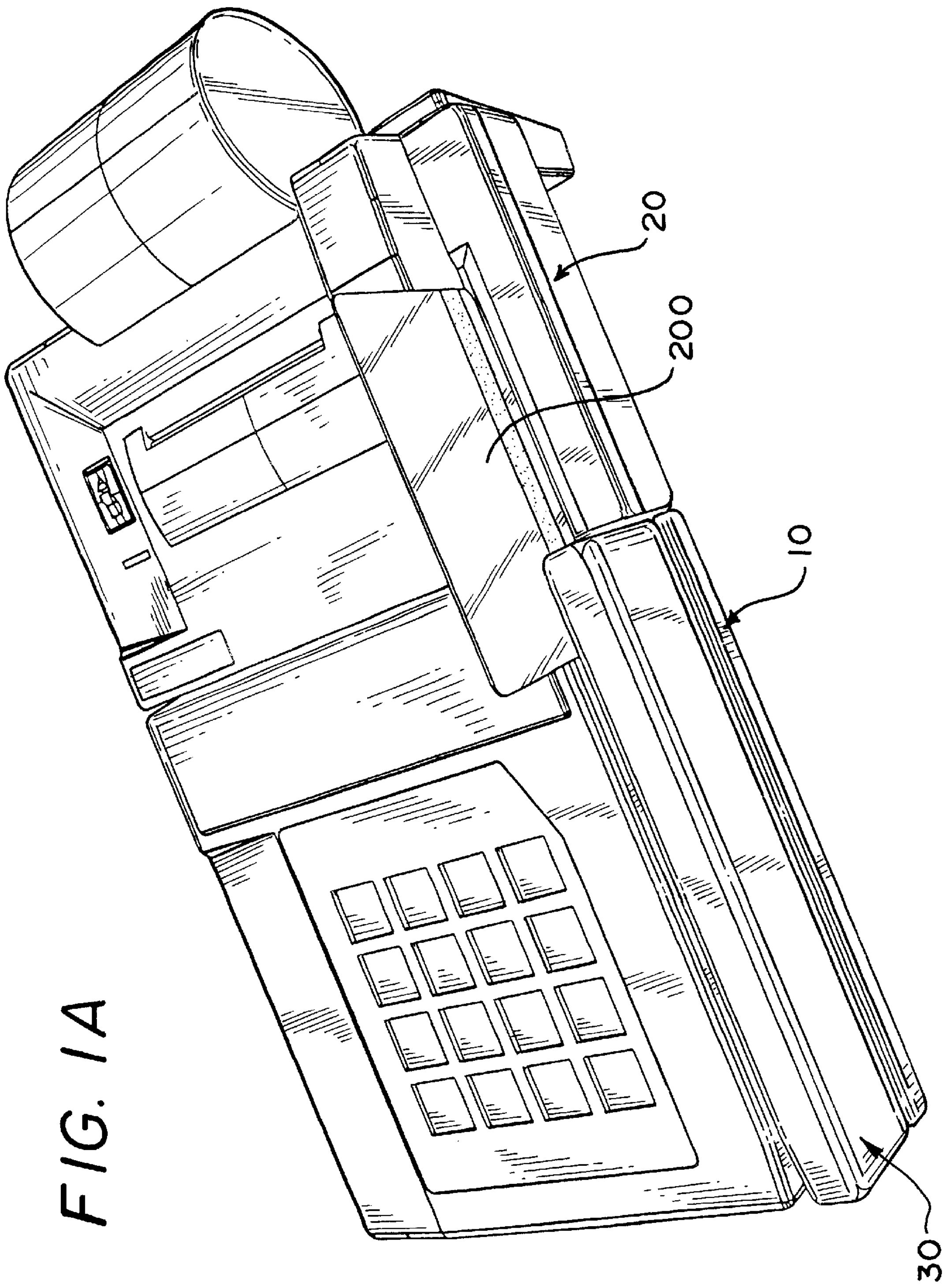
FIG. 1A is a pictorial view of a modular point-of-sale transaction apparatus in accordance with this invention with modules fully assembled for operation.
Figure 3:
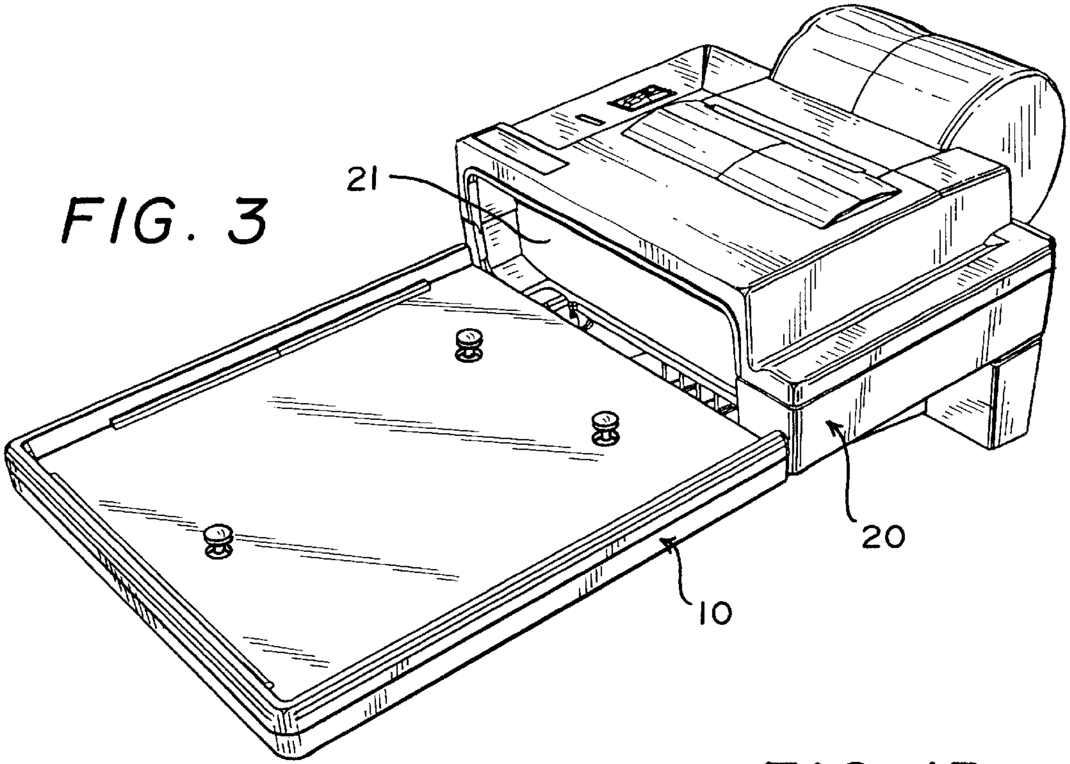
FIG. 3 is a pictorial view of a partially assembled modular point-of-sale transaction apparatus in accordance with this invention.
Figure 1B:
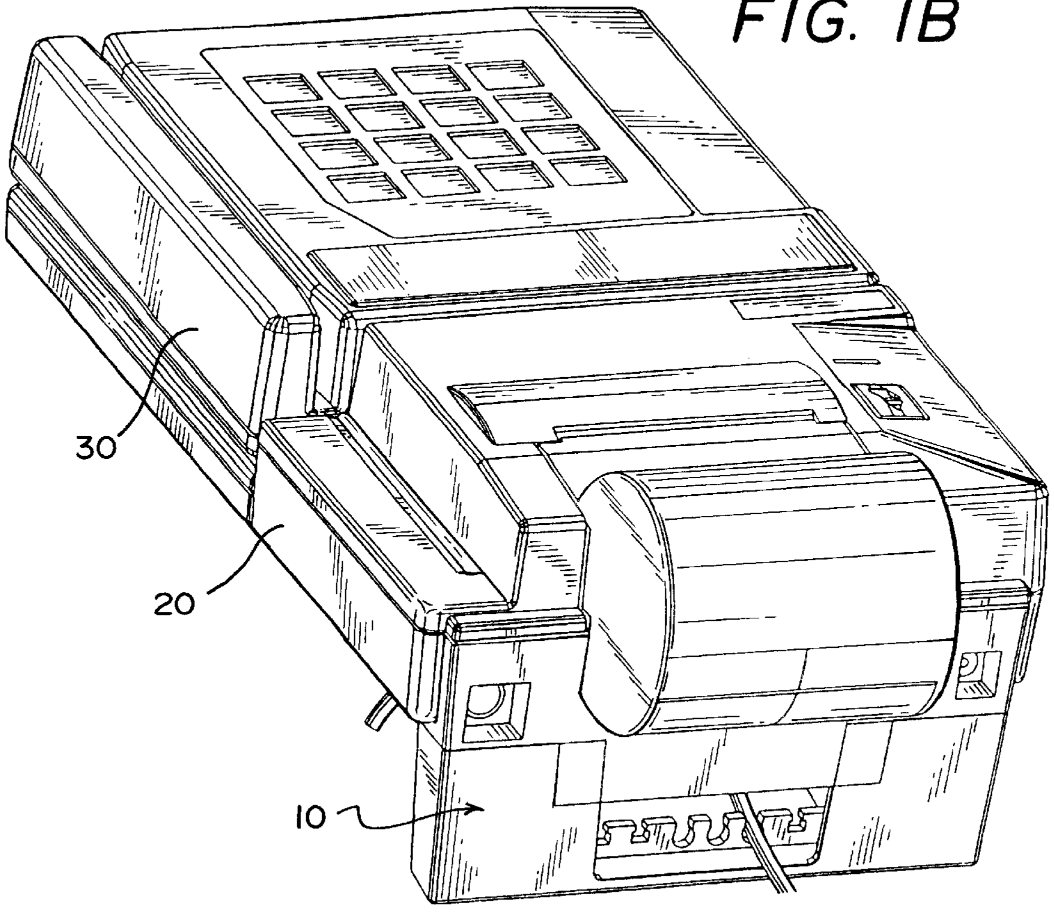
FIG. 1B is pictorial view from a different viewpoint of a modular point-of-sale transaction apparatus in accordance with this invention with modules fully assembled for operation.

Transaction terminal module 30 may comprise one of several models of transaction terminals commercially available from VeriFone, Inc. of Redwood City, Calif., namely those models which have the same footprint. FIGS. 1A and 1B illustrate use of a TRANZ 330 model of VeriFone transaction terminal. Any of the ZON XL, TRANZ 3xx, and OMNI 3xx models of terminals may also be deployed on base module 10.

Figure 4:
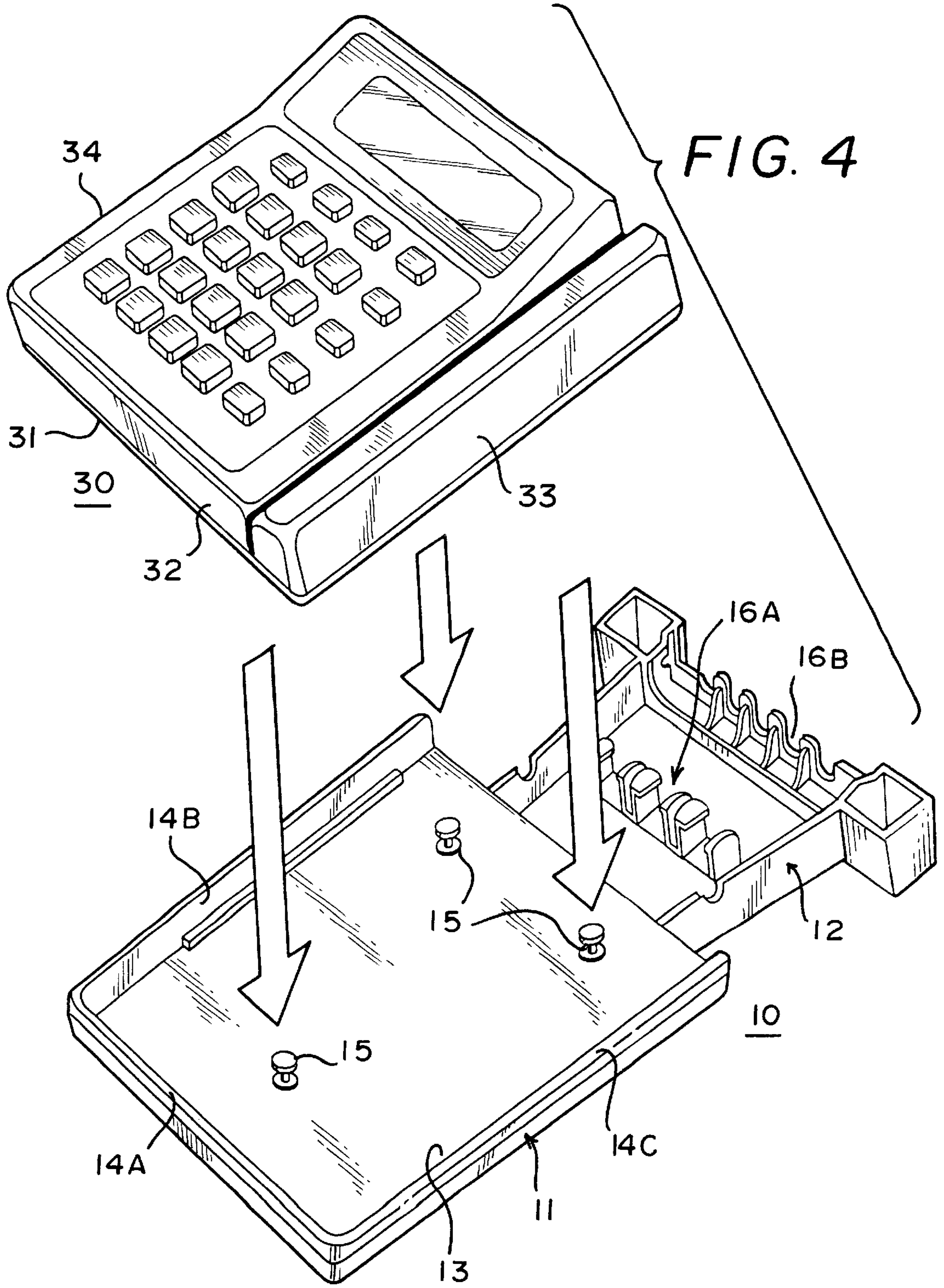
FIG. 4 is an exploded view illustrating the mounting of a transaction terminal module on a base module to form a portion of a modular point-of-sale transaction apparatus in accordance with this invention.

FIG. 4 illustrates an arrangement for mounting transaction terminal module 30 on base module 10. Base module 10 has a terminal mounting platform 11 on a forward portion thereof and a printer mounting portion 12 on a rearward portion of base module 10. The construction and assembly details of a one embodiment of base module 10 comprising two separately molded pieces are described below in conjunction with FIGS. 10–13. Terminal mounting platform 11 comprises a flat mounting surface 13 with lips 14A–14C on the sides thereof together with an arrangement of three mounting posts 15 carried on mounting surface 12.

Transaction terminal 30 has a lower base portion 35 with a smaller length and width and this lower base portion is received in the recess formed by side lips 14A–14C of terminal platform 11. Mounting posts 15 are received in three keyhole shaped insert and slide type mounting elements 73 which are molded into a bottom wall 31 of transaction terminal module 30. Transaction terminal module 30 is then pushed forward to capture it in secure fashion on mounting surface 12.

After this terminal mounting is complete, the front wall 31 and the side walls 33 and 34 of transaction terminal module 30 are aligned with the corresponding exterior walls of lips 14A–14C. This makes it difficult to discern without close inspection that the transaction terminal module 30 and base module 10 are two separate elements. This close alignment geometry of the base module 10 and transaction terminal module 30 are not essential to the invention. However, they are highly preferred from an appearance standpoint.

The aesthetic design appearance of the base module 10 and printer module 20 are the subject of a co-pending and commonly assigned design patent application filed on Jul. 31, 1995, and assigned Ser. No. 29/042,056, now U.S. Pat. No. D372,492; Issued: Aug. 6, 1996.

Alternative transaction terminal mounting arrangement could be utilized. For example, the mounting posts 15 could be eliminated and the transaction terminal module 30 could simply rest on mounting surface 13. Other alternative embodiments will be discussed below.

Figure 5:
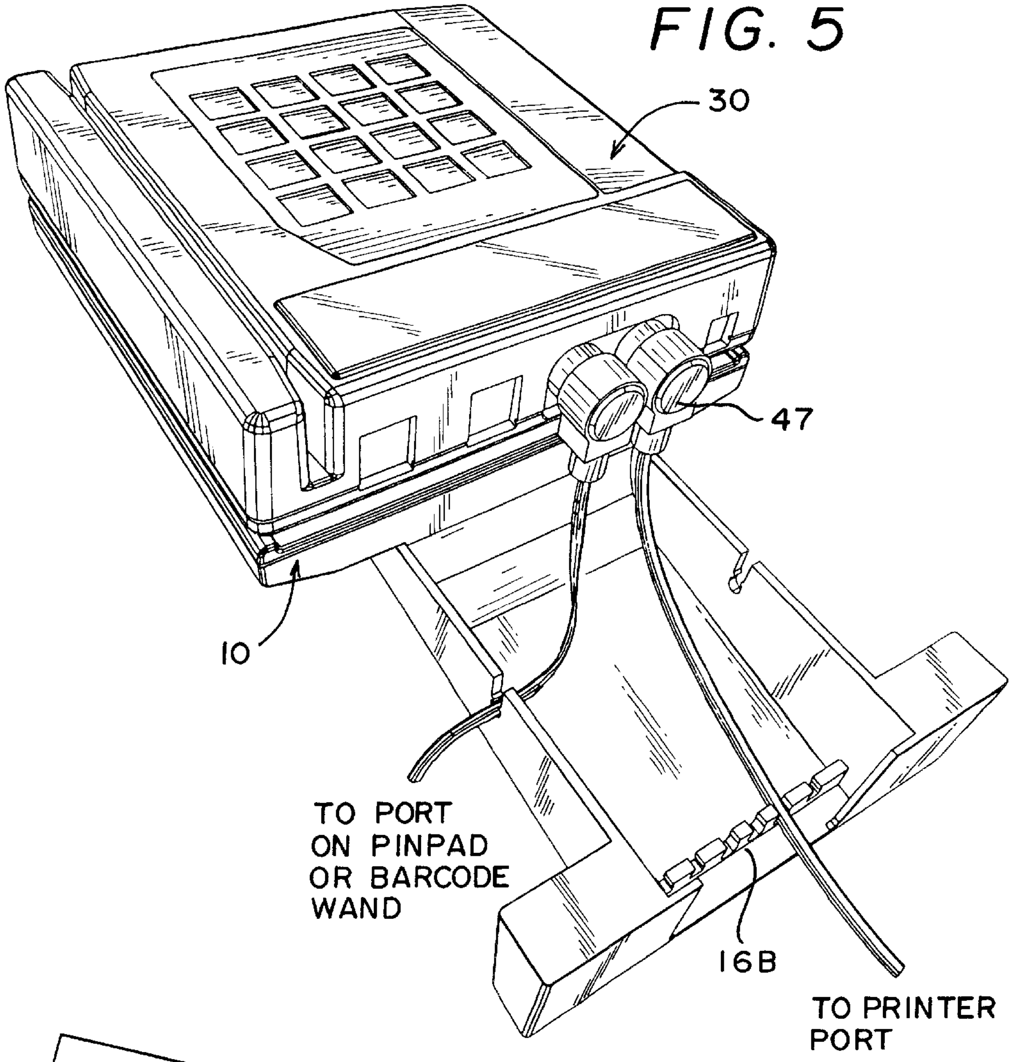
FIG. 5 is a pictorial view illustrating the connection of cables to a transaction terminal module after mounting of the terminal on a base module to form a portion of a modular point-of-sale transaction apparatus in accordance with this invention.

After transaction terminal module 30 is mounted on base module 10, data and power cables required for operation thereof are connected to transaction terminal module 30 as shown generally in FIG. 5. More details of this operation are shown in FIGS. 7–10 and discussed below. Although FIG. 5 shows a cable coming out a side slot in base module 10, the preferred arrangement is for all cables to exit through the rear cable guide 16B.

Figure 6:
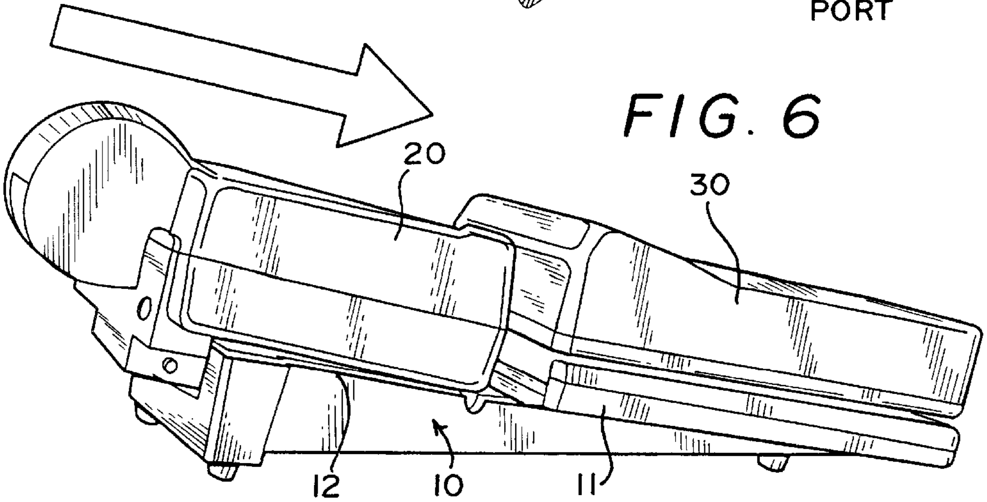
FIG. 6 is a pictorial view illustrating mounting of a printer module on a base module after a terminal module and cable connections thereto have been completed.
Figure 12:
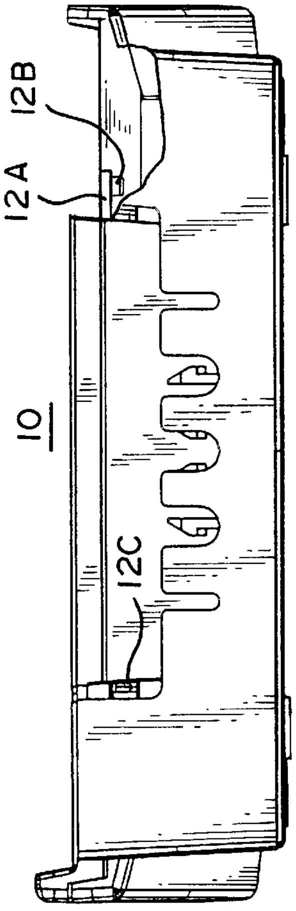
FIG. 12 is a back elevational view of a base module of a modular point-of-sale transaction apparatus in accordance with this invention with a cutaway portion to illustrate one feature thereof.
Figure 10:
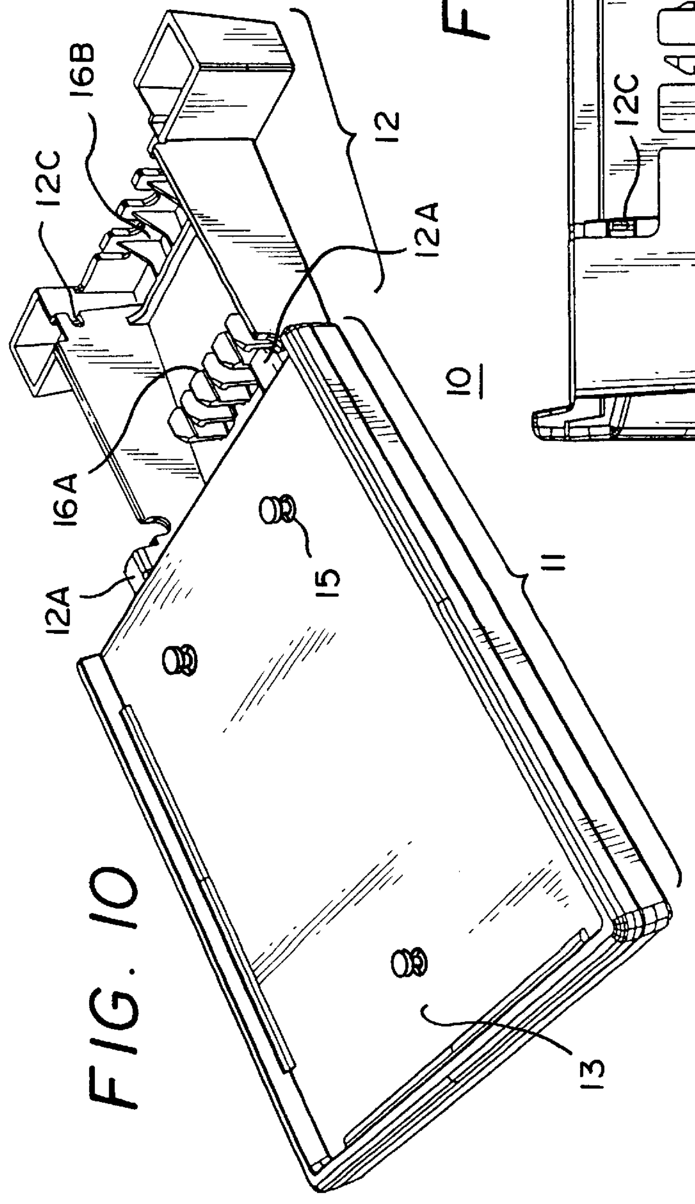
FIG. 10 is a perspective view of a base module of a modular point-of-sale transaction apparatus in accordance with this invention.
Figure 11:
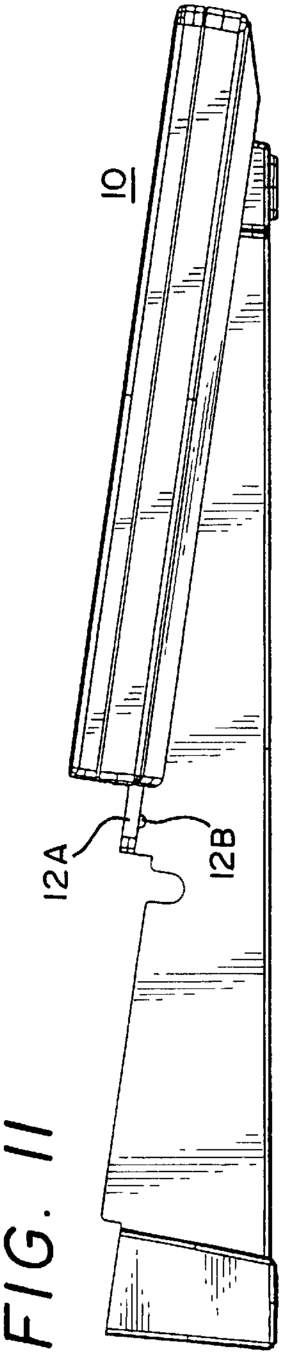
FIG. 11 is a side elevational view of a base module of a modular point-of-sale transaction apparatus in accordance with this invention.

After cable connections are made to transaction terminal module 30, printer module 20 is slid onto the printer mounting portion 12 of base module 10 as generally shown in FIG. 6. Printer module 20 is secured on base module 10 using a post and groove arrangement at the rear and a tab and detent arrangement at the front. These features will be discussed more fully below in conjunction with other drawing figures. arrangement allows the cables leading from the connectors on the back of transaction terminal module 30 to enter the cable raceways 16A and 16B formed in base module 10 and then to exit the back of base module 10 as shown in FIGS. 7 and 8.

Referring now to FIGS. 7–9, the cabling connections to printer module 20 and transaction terminal module 30 will be discussed. FIG. 7 illustrates the use of single power supply 41 to power both transaction terminal module 30 and printer module 20. Plug 42 insertable into a standard wall socket 52. Male connector 43 is inserted into the female power supply receptacle 22 on the back of printer module 20. The other male connector 44 is inserted into the female power supply receptacle 35A on the back wall of transaction terminal module 30 after the cable leading thereto is placed in one part of the cable races 16A and 16B. Serial data cable 46 is used to connect serial port 36 on transaction terminal module 30 with serial port 23 on printer module 20 using male connectors 47 and 48, respectively, after the cable is inserted into one of the cables races 16A and 16B. Telephone cord 45 is inserted into one portion of the cable races 16A and 16B and is connected on one end into phone outlet port 39 on transaction terminal module 30. The other end is insertable into a standard telephone jack 51 as shown.

Telephone outlet port 38 may be used to connect a standard voice telephone (not shown) to transaction terminal for voice communications on the same telephone line as is used for data communications.

A second serial port 36 on terminal 30 may be coupled to a bar code wand 54 via a cable 57 and connector 56 as shown in FIG. 9. Alternatively, a PIN-Pad 55 may be connected to serial port 36 via a cable 58.

FIG. 8 illustrates another connection scheme using two separate power supplies 41A and 41B for transaction terminal module 30 and printer module 20. This arrangement is likely to be used if the customer already possessing a transaction terminal module 30 with power supply 41B. The arrangement of FIG. 7 is likely to be used when modular point-of-sale transaction apparatus of this invention is a new installation.

Figure 13A:
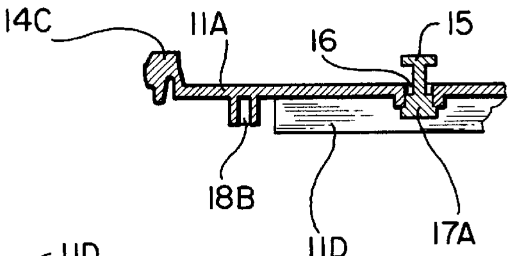
FIG. 13A is a partial section view taken along the lines A—A in FIG. 13 and illustrating features of a base module of a modular point-of-sale transaction apparatus in accordance with this invention.
Figure 13:
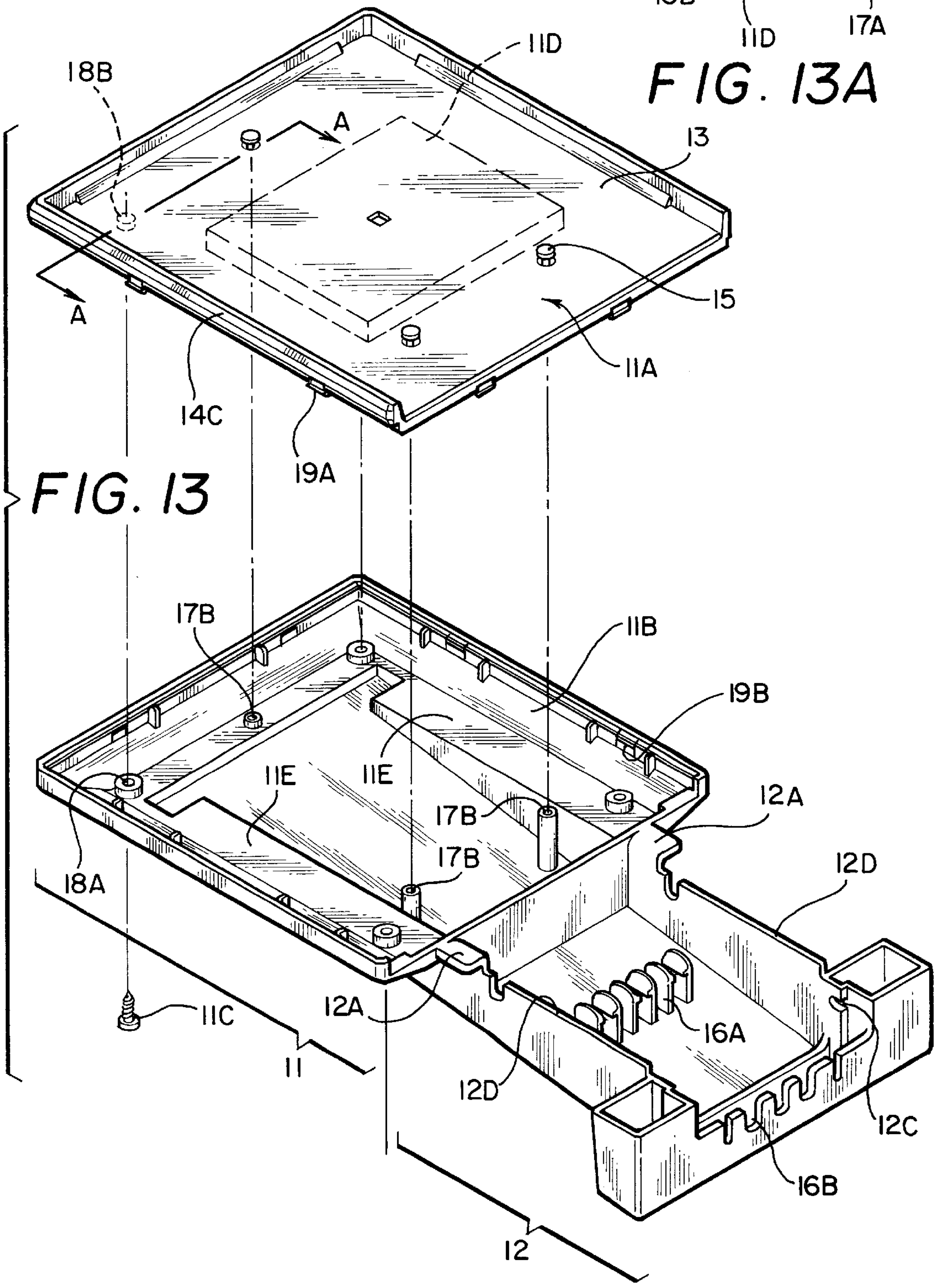
FIG. 13 is an exploded assembly drawing illustrating the use of two separately molded pieces to form a base module of a modular point-of-sale transaction apparatus in accordance with this invention.

FIGS. 10–13 illustrate the structural details of a base module 10 formed by two separately molded pieces. Referring particularly to FIGS. 13 and 13A, the construction and assembly details of this embodiment of base module 10 are illustrated. As shown, the terminal mounting platform 11 on base module 10 is comprised of two separately molded pieces, a platform piece 11A and a base piece 11B. These two pieces snap together using an arrangement of resilient hooks 19A on platform piece and catches 19B on base piece 11B. In addition, screws 11C may be used to fasten the two pies securely together. These screws extend through apertures 18A in base piece 11B and thread into holes in standoffs 18B on the underside of platform piece 11A as shown in FIG. 13A. Prior to mounting platform piece 11A onto base piece 11B, the three mounting pins 15 are inserted into apertures 16 in platform piece 11A as shown in FIG. 13A. The larger diameter portion of pins 15 is swaged or force fit into the mounting aperture 16. Standoffs 17B in base piece 11B are positioned to provide support for the mounting pins 15 when the two pieces are put together. In addition a rectangular buttress 11D is molded into the underside of platform piece 11A to provide more rigidity and preclude warping of the molded plastic piece. A portion of the bottom of this buttress rests on the horizontal wall sections 11E of base portion 11B.

Printer mounting portion 12 of base module 10 has a pair of tabs 12A located in the forward end thereof as shown in each of FIGS. 10–13. On the underside of tabs 12A is a detent 12B as shown in each of PIGS. 11 and 12. Tabs 12A are positioned with their underside raised above the printer support rails 12D by the thickness of the bottom wall section 24 on the front hollow recessed portion 21 on printer module 20 as shown in FIG. 14. A groove 25 in bottom wall section 24 receives detent 12B on tabs 12A of base module 10 as printer module 20 is slid forward on rails 12D and locks printer module 20 onto base module 10 at the forward position thereof.

In addition, printer mounting portion 12 of base module 10 has a pair of grooves 12C formed in a back portion thereof at a position below the printer support rails 12D. These grooves 12C receive posts 27 formed on opposite side walls 28A and 28B of printer module 20 as best depicted in FIGS. 15 and 16. When printer module 20 is slid fully forward on support rails 12D and detents 12B click into grooves 25, posts 27 on printer module 20 are received into and seated in grooves 12C. This mounting arrangement fully secures printer module 20 on base module 10. Detents 12B and associated grooves 25 function to preclude printer module 20 from sliding off of base module 10 and also to prevent the front portion of printer module 20 from lifting off base module 10. Tabs 27 and associated grooves 12C function to prevent the back portion of printer module 20 from being lifted off of base module 10.

It will be appreciated by those skilled in the art that other arrangements for securing printer module 20 on base module 10 could be provided without departing from this invention. For example, a pair of screws through tabs 12A could be used to fasten the forward portion of printer module 20 on base module 10. Many other mechanical fastening arrangements could be employed.

FIGS. 17A and 17B and FIG. 18 illustrate other optional approaches to achieving a modular point-of-sale transaction apparatus in accordance with this invention. In FIG. 17A the printer module and base module are combined into a single unit 110, optionally with A separate cable cover portion 111 as shown in FIG. 18. Platform portion 112 mounts transaction terminal module 30 in any suitable manner. Platform portion 112 may also house a circuit board 113 controlling operation of the printer mechanism 114. Preferably, a groove 116 would be provided in the top of the housing of the printer portion of unit 110 to accommodate a card swipe through the transaction terminal module 130.

FIG. 17B illustrates the possibility of using a combined base and printer module 130 with a printer portion 140 forward of transaction terminal module 30. This is considered a less convenient arrangement for the user of the terminal, however. It should be understood that FIGS. 17A and 17B are concept drawings only. The printer and base module in a final version would be designed with aesthetic elements which match those of transaction terminal 30 to form an overall modular assembly that has the appearance of a single integrated terminal and printer unit in the same fashion as the embodiment shown in FIGS. 1A and 1B.

It should be apparent to those of skill in the art that many variations of the embodiments of modular point-of-sale transaction apparatus in accordance with this invention could be made without departing from the invention.

Figure 4A:
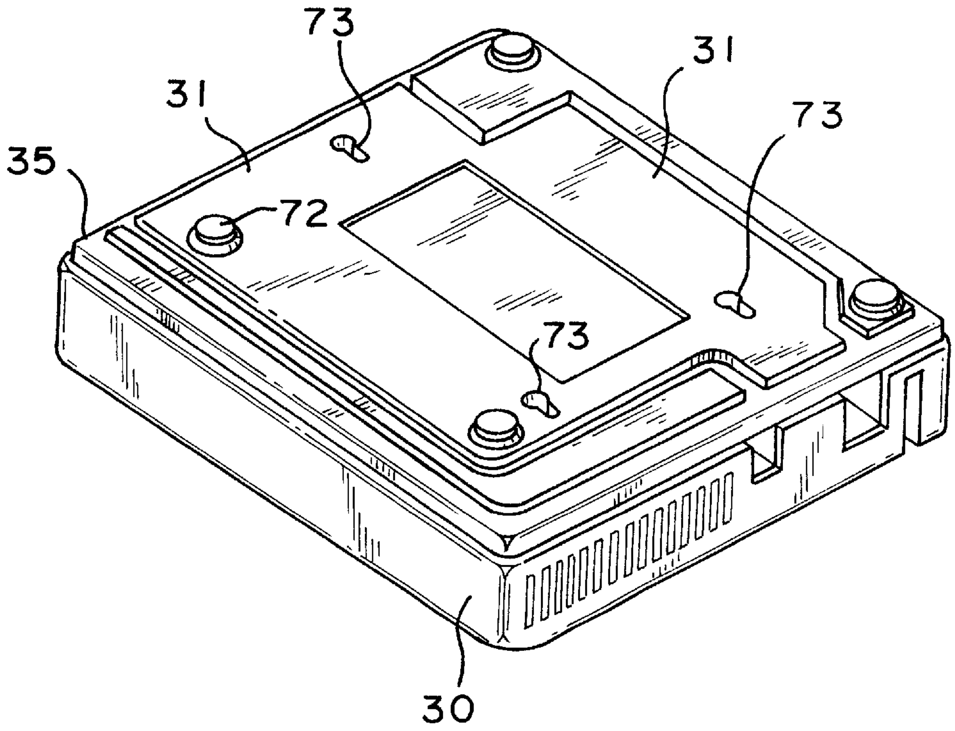
FIG. 4A is a perspective view illustrating mounting holes on the bottom of a transaction terminal module useful in explaining the mounting arrangement shown in FIG. 4.

Referring to FIG. 13, it should be apparent that a single piece base module 10 could be utilized to support and mount transaction terminal module 30. For example, base piece 11B could be used without the spate platform piece 11A by providing flat head mounting screws in standoffs 17B to be received into mounting slots 73 of transaction terminal module 30 as shown in FIG. 4A. The feet 72 on the bottom of transaction terminal module 30 could rest on the standoffs 18A properly positioned and shaped with elongation in the direction of sliding of transaction terminal module 30 after setting it on the mounting screws. The edges of section 11 of base module 10 could be raised higher to give close to the same aesthetic appearance of the preferred embodiment shown in the FIGS. 1A and 1B.

In another variation, the transaction terminal mounting portion 11 of base module 10 could be a separate unit from the printer module mounting section 12 with an arrangement to fasten the two module pieces together after or before the transaction terminal module 30 and printer module 20 are mounted thereon.

In another variation, printer module 20 could be provided with an arrangement of connectors positioned in the recessed portion 21, i.e. connectors that plug directly into the various ports on the back of transaction terminal module 30, with lead through of some ports, if necessary, to the back of the printer for connection there to external units such as power supply or telephone jack. In another variation, printer module 20 could have a top housing molded with a card slot aligned with that of transaction terminal module 30 rather than having an indented right hand shelf section with a shallow groove receiving a small portion of a transaction card 200 as shown in FIGS. 1A and 1B.

In another variation, base module 10 and printer module 20 could be combined using two or three molded plastic housing portions that snap together or otherwise fasten together before mounting transaction terminal module 30 thereon. This variation would be especially suitable if connectors to the ports of the transaction terminal module 30 are provided in the recessed forward wall portion of printer module 20. Securing transaction terminal module 30 on the forward mounting platform of the combined base module and printer module could be achieved by providing a simple adapter on the bottom of transaction terminal module 30 to reverse the direction of the slots 73, for example, so that transaction terminal module 30 could mount on platform portion 11 with a backwards sliding movement.

Alternatively, the mounting pins 15 could be provided on detented or otherwise locking and sliding tabs accessible from the bottom of the base module. Using this approach, the transaction terminal module 30 could have cables inserted in the back, and then placed on the mounting platform over the mounting pins with cable connectors received into the recessed portion of the printer housing. The mounting pins could then be slid backwards and locked in position to capture the transaction terminal module 30 on its mounting platform.

Many other changes and modifications could be made to various embodiments of the invention without departing from the scope of the invention as set forth in the following claims.

What is claimed is:

1. A modular point-of-sale transaction apparatus comprising a modular portion having a housing and a printer mechanism mounted within said housing and having structural means providing a terminal platform for supporting a transaction terminal in a prearranged position forward or rearward of said housing and printer mechanism; said housing for said printer and said terminal platform for supporting said transaction terminal being formed in size and shape and location relative to the size and shape of said transaction terminal such that said transaction terminal covers the entire area of said terminal platform so that the combination of said modular portion and a transaction terminal mounted on said terminal platform has substantially the appearance of a single integrated terminal and printer apparatus.

2. Apparatus as claimed in claim 1, wherein said modular portion comprises the combination of a base module and a separate printer module comprising said housing and said printer mechanism mounted on a printer mounting portion provided on a rearward portion of said base module, said terminal platform being defined on said base module at a prearranged forward portion thereof and adapted to mount a transaction terminal thereon in a position such that a back wall portion of said transaction terminal is adjacent to a front wall portion of said printer module.

3. Apparatus as claimed in claim 2, wherein said printer module is adapted to be used with a transaction terminal adapted to have power and data connector means mounted on a rearward facing wall thereof, and said housing of said printer module has a recessed forward wall portion adapted to cover said power and data connector means when both said printer module and said transaction terminal are mounted on said base module.

4. Apparatus as claimed in claim 2, wherein said terminal platform has first securing means formed on a top wall surface thereof and adapted for cooperating with associated second securing means defined on a bottom wall surface of said transaction terminal to secure said transaction terminal on said terminal platform of said base module.

5. Apparatus as claimed in claim 2, wherein said printer mounting portion of said base module and bottom wall portions of said housing of said printer module cooperatively provide a slide-on mounting relationship between said base module and said printer module, including cooperative detent and groove means for securing said printer module on said printer mounting portion of said base module;

said printer module is adapted to be used with a transaction terminal adapted to have power and data connector means mounted on a rearward facing wall thereof, and said housing of said printer module has a recessed forward wall portion adapted to cover said power and data connector means when both said printer module and said transaction terminal are mounted on said base module.

6. Apparatus as claimed in claim 2, wherein said printer module is adapted for use with a transaction terminal having a magnetic card reader slot defined in a top wall portion thereof adjacent a prearranged sidewall of said transaction terminal, and said housing of said printer module includes a top housing portion defining a shelf region on a side corresponding to the position of said magnetic card reader slot of said transaction terminal for admitting a magnetic card to said magnetic card reader slot when both said transaction terminal and said printer module are mounted on said base module.

7. Apparatus as claimed in claim 2, wherein said printer module is adapted for use with a transaction terminal having a magnetic card reader slot defined in a top wall portion thereof adjacent a prearranged sidewall of said transaction terminal, and said housing of said printer module includes a top housing portion defining a card slot section formed on a side corresponding to the position of said magnetic card reader slot of said transaction terminal, said card slot section on said printer module adapted to cooperate with said said magnetic card reader slot to form an apparently integrated card slot when both said transaction terminal and said printer module are mounted on said base module.

8. Apparatus as claimed in claim 1, wherein said modular portion comprises the combination of a base module and a separate printer module comprising said housing and said printer mechanism mounted on a printer mounting portion provided on a rearward portion of said base module, said terminal platform is defined on said base module at a prearranged forward portion thereof and adapted to mount a transaction terminal thereon in a position such that a back wall portion of said transaction terminal is adjacent to a front wall portion of said printer module, said printer module is adapted to be used with a transaction terminal adapted to have power and data connector means mounted on a rearward facing wall thereof, and said housing thereof has a recessed forward wall portion adapted to cover said power and data connector means when both said printer module and said transaction terminal are mounted on said base module;

said printer mounting portion of said base module comprising an open frame section having cable races defined thereon and adapted for receiving cables of said power and data connector means for said transaction terminal to route said cables underneath said printer module and through a back wall portion of said base module.

9. Apparatus as claimed in claim 8, wherein said terminal platform has first securing means formed on a top wall surface thereof and adapted for cooperating with associated second securing means defined on a bottom wall surface of said transaction terminal to secure said transaction terminal on said terminal platform; and said printer mounting portion of said base module and bottom wall portions of said housing of said printer module cooperatively provide a slide-on mounting relationship between said base module and said printer module, including cooperative detent and groove means for securing said printer module on said printer mounting portion of said base module, whereby said apparatus is adapted to be assembled with a transaction terminal by first mounting and securing said transaction terminal on said terminal platform using said first securing means, then attaching said power and data connector means to said terminal at a rear wall portion thereof and placing the cables of said power and data connector means in said cable races defined on said open frame section, followed by sliding said printer module onto said printer mounting portion of said base module until said cooperative detent and groove means engage and said recessed forward wall portion of said printer module covers said power and data connector means attached to said rear wall portion of said terminal.

10. Apparatus as claimed in claim 9, wherein said printer module is adapted for use with a transaction terminal having a magnetic card reader slot defined in a top wall portion thereof adjacent a prearranged sidewall of said transaction terminal, and said housing of said printer module includes a top housing portion defining a shelf region on a side corresponding to the position of said magnetic card reader slot of said transaction terminal for admitting a magnetic card to said magnetic card reader slot when both said transaction terminal and said printer module are mounted on said base module.

11. Apparatus as claimed in claim 9, wherein said printer module is adapted for use with a transaction terminal having a magnetic card reader slot defined in a top wall portion thereof adjacent a prearranged sidewall of said transaction terminal, and said housing of said printer module includes a top housing portion defining a card slot section a side corresponding to the position of said magnetic card reader slot of said transaction terminal, said card slot section on said printer module adapted to cooperate with said magnetic card reader slot to form an apparently integrated card slot when both said transaction terminal and said printer module are mounted on said base module.

12. A modular point-of-sale transaction apparatus comprising a base module, a printer module mounted on said base module, and a transaction terminal mounted on said base module, said base module having structural means providing a terminal platform for supporting a transaction terminal in a prearranged position forward or rearward of said printer module, said printer module having a housing of prearranged size and shape and said terminal platform being formed in size and shape and location such that said transaction terminal covers the entire area of said terminal platform so that the combination of said base module, said transaction terminal and said printer module has substantially the appearance of a single integrated terminal and printer apparatus.

13. Apparatus as claimed in claim 12, wherein said printer module is mounted on a printer mounting portion of said base module defined on a rearward portion of said base module, said terminal platform is defined on said base module at a prearranged forward portion thereof; and said transaction terminal is mounted on said terminal platform of said base module in a position such that a back wall portion of said transaction terminal is adjacent to a front wall portion of said printer module.

14. Apparatus as claimed in claim 13, wherein said transaction terminal has power and data connector means mounted on a rearward facing wall thereof, and and said printer module has a housing with a recessed forward wall portion adapted to cover said power and data connector means of said transaction terminal when both said printer module and said transaction terminal are mounted on said base module.

15. Apparatus as claimed in claim 12, wherein said terminal platform has first securing means formed on a top wall surface thereof and adapted for cooperating with second securing means defined on a bottom wall surface of said transaction terminal to secure said transaction terminal on said terminal platform of said base module.

16. Apparatus as claimed in claim 15, wherein said printer mounting portion of said base module and bottom wall portions of said housing of said printer module cooperatively provide a slide-on mounting relationship between said base module and said printer module, including cooperative detent and groove means for securing said printer module on said printer mounting portion of said base module;

said transaction terminal has power and data connector means mounted on a rearward facing wall thereof, and said printer module includes a housing with a recessed forward wall portion adapted to cover said power and data connector means mounted on said rear wall of said transaction terminal when said transaction terminal is mounted firstly on said terminal platform of said base module and followed by mounting of said printer module on said base module with said recessed forward wall portion of said printer module sliding over and covering said power and data connector means.

17. Apparatus as claimed in claim 12, wherein said transaction terminal has a magnetic card reader slot defined in a top wall portion thereof adjacent a prearranged sidewall thereof said printer module includes a top housing portion defining a shelf region on a side corresponding to the position of said magnetic card reader slot of said transaction terminal for admitting a magnetic card to said magnetic card reader slot of said transaction terminal when both said transaction terminal and said printer module are mounted on said base module.

18. Apparatus as claimed in claim 12, wherein said transaction terminal has a magnetic card reader slot defined in a top wall portion thereof adjacent a prearranged sidewall thereof; and said printer module includes a top housing portion defining a card slot section on a side corresponding to the position of said magnetic card reader slot of said transaction terminal, said card slot section on said printer module adapted to cooperate with said magnetic card reader slot to form an apparently integrated single card slot.

19. A method of assembling a modular point-of-sale transaction apparatus using an existing type of transaction terminal of particular design and shape and having rear wall power and data connectors, comprising the steps of:

forming a base module with a transaction terminal mounting platform on a forward portion thereof and a printer mounting section on a rearward portion thereof with said terminal mounting platform having size and shape such that it accommodates the shape of said transaction terminal;

forming a printer module adapted to mount on said base module and having a size and shape adapted to integrate well with the size and shape of said transaction terminal, including a forward wall section adapted to receive cover said power and data connectors;

mounting said transaction terminal on said terminal platform of said base module;

mounting said power and data connectors to said rear wall of said terminal; and mounting said printer module on said printer mounting portion of said base module with said forward wall section thereof covering said power and data connectors.

* * * * *